Patented Oct. 17, 1950

2,525,818

UNITED STATES PATENT OFFICE 2,525,818

PRODUCTION OF NITRILES

John E. Mahan, Bartlesville, Okla., assignor to Phillips Petroleum Company, a corporation of Delaware No Drawing. Application June 24, 1946, Serial No. 678,892

10 Claims. (Cl. 260—465.1)

This invention relates to the production of nitriles from aldehydes. In one of its specific aspects the present invention relates to the vapor phase interaction of secondary and tertiary aldehydes and ammonia in the presence of a catalyst to produce valuable nitriles. The process of the present invention is particularly useful for the production of isobutyronitrile, benzonitrile, and furoic nitrile.

In general, the interaction of an aldehyde and ammonia leads to the formation of addition compounds of the aldehyde-ammonia type, or to production of pyridine or pyridine derivatives, depending upon the reaction conditions. The reaction between ammonia and an aldehyde at ordinary low temperatures produces an addition product known as an aldehyde-ammonia. The formation of these products from low-molecular weight aldehydes is reported extensively in the literature. Pyridines may be produced by reacting a mixture of aldehyde vapors and ammonia at elevated temperatures. By the process of the present invention saturated nitriles are produced by reacting secondary or tertiary aldehydes with ammonia at elevated temperatures in the presence of novel catalysts. Primary aldehydes, on the other hand, lead to the formation of pyridine and pyridine derivatives.

An object of the present invention is to provide a process for the production of nitriles. Another object is to provide a novel process for the production of nitriles by the catalytically activated interaction of an aldehyde with ammonia. Another object of this invention is to provide novel catalysts for the interaction of an aldehyde with ammonia to produce nitriles.

I have now found that under suitable operating conditions and in the presence of specific catalysts, selected aldehydes can be interacted with ammonia to produce the corresponding nitriles. Various secondary and tertiary aldehydes may be employed to produce secondary and tertiary nitriles by reaction with ammonia in accordance with the present invention. The secondary aldehydes, of which isobutyraldehyde is the simplest member, have one hydrogen atom directly attached to the alpha carbon atom and may be represented structurally as follows:

wherein the secondary carbon atom may be a part of a ring or attached to alkyl, aryl, or aralkyl groups. The tertiary aldehydes, of which trimethyl acetaldehyde is the simplest member, contain no hydrogen attached to the alpha carbon atom and may be represented structurally as follows:

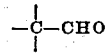

wherein the tertiary carbon atom may be attached to alkyl, aryl, or aralkyl groups or may be a part of a ring. The alpha carbon atoms, secondary or tertiary as the case may be, may be attached to alkyl, aryl, or aralkyl groups which may be identical or in any combination. The method of the present invention is applicable to aromatic aldehydes, for example, benzaldehyde, and to heterocyclic aldehydes, for example, furfural. The process may be applied to the reaction of ammonia with substantially all aldehydes characterized by the presence of not more than one directly-attached hydrogen atom on the alpha carbon atom. As examples of the aldehydes suitable for use in the present invention the following may be mentioned: isobutyraldehyde, trimethyl acetaldehyde, benzaldehyde, furfural, etc.

An advantage of the present invention lies in the provision of a large class of new starting materials for the production of nitriles. A wide variety of nitriles may be produced as is illustrated by the examples of suitable aldehydes given above which are illustrative only and are not to be construed as limiting the invention in any way. Another important advantage of the present process lies in its adaptability to continuous operation. When operating continuously, superior ultimate yields may be obtained by separation and recycling of unchanged reactants.

In general, the nitriles may be prepared in accordance with my invention by the reaction of a secondary or tertiary aldehyde with ammonia at an elevated temperature and the presence of specific catalysts more fully disclosed hereinafter. The general procedure used for the production of nitriles in accordance with this invention is to admix ammonia with the aldehyde vapors using a molecular excess of ammonia. The ratio of ammonia to aldehyde in the mixture is preferably within the range of from 3 to 6 gaseous volumes of ammonia per gaseous volume of aldehyde, i. e., the molar ratio of ammonia to aldehyde is preferably within the range of 3:1 to 6:1. The reactants may be introduced into the catalyst chamber separately but preferably the two vapor streams are admixed before introduction into the reaction zone. An inert diluent, such as nitrogen gas, may be added, if desired. It is preferred that the reactants be anhydrous or substantially anhydrous. It is often desirable to add the aldehyde to the ammonia in increments either continuously or intermittently in such manner that the concentration of the aldehyde is always kept at a relatively low value.

The reaction may be carried out at various temperatures and contact times as determined by the particular aldehyde used. Operating temperatures are variable over a rather wide range depending upon the particular aldehyde treated, but the temperature should be sufficiently high to insure vapor phase of the reactants. While the preferred temperature for a given mixture will usually fall somewhere within the range of from about 500° F. to about 1000° F., it will be obvious to those skilled in the art that temperatures above the decomposition temperature of a reactant are undesirable since they result in the production of products other than the corresponding nitriles. This is particularly true when aldehydes of high molecular weight are employed. A temperature within the range of from about 600° F. to about 850° F. is generally preferred. Relatively low pressures are preferred; however, pressures from subatmospheric to 50 pounds per square inch gage or higher may be employed. A pressure approximately equal to atmospheric pressure or elevated sufficiently to produce flow through the catalyst zone is entirely satisfactory and is in general used. A contact time within the range from about 0.5 to about 2 seconds is suitable for the reaction. The reaction period may be varied somewhat depending upon the particular reactant and reaction conditions employed and longer or shorter contact times may be required. The contact time should be sufficient for an economical conversion per pass but not so long as to result in an excessive amount of decomposition of the product. By the use of short contact times with recycling of unchanged reactants it is possible to avoid excessive decomposition and still obtain good ultimate yields.

The catalysts of the present invention are metals intimately admixed with oxides of the dehydrating type. The metals which I have found to be effective are copper, silver, cobalt, and nickel, either alone or in admixture with one another. The dehydrating oxides used in the catalyst of the present invention are the oxides of aluminum and silicon. The aluminum oxide may be in the form of bauxite, or synthetic alumina. The oxide of silica is preferably in the form of silica gel. The oxides of aluminum and silicon may also be used in admixture with one another, preferably in the form of silica-alumina gel. Mixtures of the oxides of aluminum and silicon in the form of clays may also be used. The catalyst of the present invention comprises a metal selected from the group consisting of nickel, cobalt, cooper and silver in admixture with an oxide of an element selected from the group consisting of aluminum and silicon. The catalyst may be made up of one or more of the metals admixed with one or more of the dehydrating oxides. The dehydrating oxides are difficultly reducible. The catalyst may be prepared by coprecipitating the dehydrating oxides and the hydroxide of the metal, then reducing the metal hydroxide with hydrogen to the metallic state. Another method of preparation which may be employed is impregnation of the dehydrating oxide with a solution of a salt of the metal. The metal salt is then decomposed to the corresponding oxide by ignition, and the resulting oxide, in turn, reduced by hydrogen to free metal. The nitrates or acetates of the metal are suitable as the salt for this method of preparation.

On continued use the catalysts gradually become inactive; however, regeneration is readily effected by the passage of air over said catalyst at the temperature of the reaction. During this operation the metals are partially converted to the oxide, and conversion to the metals is again accomplished by passing hydrogen over the catalyst.

In a general embodiment the present invention is carried out by preheating aldehyde and ammonia feed streams which are then combined in a manner such that ammonia is in substantial molar excess. The resulting mixture of the aldehyde and ammonia is then passed in vapor phase over the catalyst under conditions suitable for reaction of the aldehyde with ammonia to form the corresponding nitrile. Unchanged reactants are then separated from the effluent and may be returned to the feed stream for recycle to the process. The crude nitrile may then be purified in any suitable manner, for example, by fractional distillation. Unusually high yields of nitriles are obtained by the reaction of an aldehyde and ammonia in accordance with this invention.

The following examples are offered by way of illustration of the applicability of the process for the production of various nitriles; however, they are to be construed as illustrative only and not as unnecessarily limiting the invention.

*Example I*

Feed streams comprising isobutyraldehyde and ammonia were separately preheated to a temperature of approximately 670° F. after which they were combined in a mol ratio of one part of isobutylraldehyde to five parts of ammonia. The combined stream was contacted with a ctalyst comprising 15 per cent metallic copper supported on activated alumina. Temperature in the catalyst zone was held between 670 and 780° F. and the rate of flow was such that the contact time was between one and 1.5 seconds. A per pass yield of isobutyronitrile of 25 mol per cent was obtained. Tests on the product showed that no pyridine or pyridine derivatives were produced.

*Eaxple II*

The experiment of Example I was repeated employing benzaldehyde as starting material. Ratio of reactants, catalyst, composition, and operating conditions were substantially the same as before. A per pass yield of benzonitrile of 46 mol per cent was obtained.

From the foregoing it is believed that the many advantages obtainable by the practice of the present invention will be readily apparent to persons skilled in the art. However, since certain changes may be carried out in the above method without departing from the scope of the invention as defined by the appended claims, it is intended that all matter contained herein shall be interpreted as illustrative and explanatory rather than in a limiting sense.

I claim:

1. A process for the production of nitriles which comprises reacting an aldehyde selected from the group consisting of secondary and tertiary aldehydes with ammonia at a temperature within the range of from 500 to 850° F. in the presence of a catalyst comprising a minor portion of copper in intimate admixture with an oxide of an element selected from the group consisting of aluminum and silicon.

2. A process for the production of isobutyronitrile which comprises reacting isobutyraldehyde and ammonia at a temperature within the range of from 500 to 850° F. in the presence of copper in intimate admixture with an oxide of an element selected from the group consisting of aluminum and silicon.

3. A process for the production of benzonitrile which comprises reacting benzaldehyde with ammonia at a temperature within the range of from 500 to 850° F. in the presence of copper in intimate admixture with an oxide of an element selected from the group consisting of aluminum and silicon.

4. A process for the production of furoic nitrile which comprises reacting furfural with ammonia at a temperature within the range of from 500 to 850° F. in the presence of copper in intimate admixture with an oxide of an element selected from the group consisting of aluminum and silicon.

5. A process for the preparation of isobutyronitrile which comprises reacting isbutyraldehyde with ammonia at a temperature within the range of from 600 to 850° F. in the presence of a catalyst comprising metallic copper supported on an oxide of an element selected from the group consisting of aluminum and silicon.

6. A process as defined in claim 5 wherein said oxide is activated alumina.

7. A process for the production of isobutyronitrile which comprises reacting isbutyraldehyde with ammonia at a temperature within the range of from 670 to 780° F. in the presence of a catalyst comprising metallic copper in association with alumina.

8. A process for the production of secondary and tertiary nitriles which comprises reacting the corresponding aldehyde with ammonia in an aldehyde-ammonia molar ratio of 1:3 to 1:6 at a temperature within the range of 500–850° F. in the presence of a catalyst comprising no other catalytic metal than copper supported on an oxide of an element selected from the group consisting of aluminum and silicon.

9. A process for the production of secondary and tertiary nitriles which comprises contacting an anhydrous, vaporous mixture comprising the corresponding aldehyde and ammonia in a molar ratio of from 1:3 to 1:6 at a temperature of 600–850° F. for from 0.5 to 2 seconds with a catalyst comprising no other catalytic metal than copper supported on an oxide of an element selected from the group consisting of aluminum and silicon.

10. A process for the production of isobutyronitrile which comprises contacting an anhydrous, vaporous mixture comprising isobutyraldehyde and ammonia in a molar ratio of 1:3 at a temperature of 670–780° F. for from 1.0 to 1.5 seconds with a catalyst comprising 15 per cent metallic copper supported on alumina.

JOHN E. MAHAN.

REFERENCES CITED

The following references are of record in the file of this patent:

UNITED STATES PATENTS

| Number | Name | Date |
|---|---|---|
| 2,337,421 | Spence et al. | Dec. 21, 1943 |
| 2,412,437 | Wagner | Dec. 10, 1946 |
| 2,418,562 | Teter | Apr. 8, 1947 |
| 2,443,420 | Gresham | June 15, 1948 |
| 2,452,187 | Gresham | Oct. 26, 1948 |

FOREIGN PATENTS

| Number | Country | Date |
|---|---|---|
| 369,371 | Germany | Feb. 17, 1923 |
| 334,193 | Great Britain | Aug. 25, 1930 |
| 547,518 | Germany | Mar. 23, 1932 |

OTHER REFERENCES

Maihle et al., Compt. rendus (Fr. Acad. Sci.), pp. 215–217 (1918).